United States Patent
Wicks et al.

[11] Patent Number: 6,060,995
[45] Date of Patent: May 9, 2000

[54] NIGHTLIFE INFORMATION PAGER

[75] Inventors: James E. Wicks, San Francisco, Calif.; Eduardo Sciammarella, Hoboken, N.J.

[73] Assignees: Sony Corporation, Tokyo, Japan; Sony Electronics, Inc., Park Ridge, N.J.

[21] Appl. No.: 08/802,583

[22] Filed: Feb. 19, 1997

[51] Int. Cl.[7] .................................................. G08B 5/22
[52] U.S. Cl. ...................................................... 340/825.44
[58] Field of Search ............................... 340/825.44, 905, 340/825.27, 825.56; 455/38.1, 38.4, 53.1, 54.2, 56.1

[56] References Cited

U.S. PATENT DOCUMENTS

| | | | |
|---|---|---|---|
| 4,415,065 | 11/1983 | Sandstedt | 186/39 |
| 4,644,351 | 2/1987 | Zabarsky et al. | 340/825.44 |
| 4,951,039 | 8/1990 | Schwendeman et al. | 340/725 |
| 5,173,688 | 12/1992 | DeLuca et al. | 340/825.44 |
| 5,182,553 | 1/1993 | Kung | 340/825.44 |
| 5,331,431 | 7/1994 | Jasinski | 348/462 |
| 5,446,678 | 8/1995 | Saltzstein et al. | 364/514 |
| 5,452,356 | 9/1995 | Albert | 380/9 |
| 5,481,255 | 1/1996 | Albert et al. | 340/825.55 |
| 5,491,785 | 2/1996 | Robson et al. | 395/162 |
| 5,495,344 | 2/1996 | Callaway, Jr. et al. | 358/407 |
| 5,508,695 | 4/1996 | Nelson et al. | 340/825.37 |
| 5,535,428 | 7/1996 | King et al. | 455/38.4 |
| 5,555,446 | 9/1996 | Jasinski | 340/825.44 |
| 5,684,859 | 11/1997 | Chanroo et al. | 455/33.1 |
| 5,701,580 | 12/1997 | Yamane et al. | 340/825.44 |

*Primary Examiner*—Michael Tokar
*Assistant Examiner*—Jean B. Jeanglaude
*Attorney, Agent, or Firm*—Ronald P. Kananen; Rader, Fishman & Grauer

[57] ABSTRACT

A novel paging technology allows a group of subscribers to share and take advantage of nightlife information. A service provider collects and stores such information. The information is then compared to a profile for each subscriber detailing what type of information that subscriber is interested in receiving. Information may further be screened for that relevant to an particular area where the subscriber's pager is determined to be. Information matching the interest profile and/or location of each subscriber is then transmitted to that subscriber's pager. Each subscriber's pager may include an input device, such as a virtual keyboard, so that each subscriber can submit information to the system to be shared with other subscribers.

6 Claims, 3 Drawing Sheets

NIGHTLIFE INFORMATION PAGER

FIELD OF THE INVENTION

The present invention relates generally to the field of wireless pagers. More particularly, the present invention relates to an application of wireless pager technology as a means of collecting and disseminating information regarding an area's nightlife.

BACKGROUND OF THE INVENTION

Portable radio receivers and transceivers, such as wireless pagers, have become increasingly popular as a means of communication. Pagers are typically carried by users who wish or need to receive communications when they are away from a telephone or computer, or are unable to predict where they may be reached at a given time.

In general, the user of a pager purchases the unit and enters into a contract with a service provider. As shown in FIG. 1, when someone 12 wishes to page a particular user, they contact the user's service provider 11, identify the user to be paged (perhaps with a personal identification number), and may give a message to the service provider 11 that is to be broadcast to the user's pager 15.

The service provider 11 maintains a network of radio transceiver base stations 13, 14 which are spread throughout the service area covered by the service provider. The transmitting base stations 13 are distributed so that transmissions from at least one base station can be received by a pager 15 anywhere in the service area.

In a simplistic system, when the service provider 11 receives a request to page a user 15, the page is broadcast by all the base stations 13 in the system. Thus, if the pager 15 is located anywhere in the service area, it will receive the page. The pager 15 will then alert the user that a page has been received with, for example, an audible or vibratory alert signal.

In a more sophisticated system, the pager 15 may have the capability to not only receive a transmission from the service provider's system, but also to transmit an answer back to the system. This is referred to as two-way paging.

With these advances, the usefulness of pagers as a means of communication has expanded rapidly. Service providers have encouraged this expansion by experimenting with pagers as a means to disseminate information of interest to pager users. For example, as described in U.S. Pat. No. 5,508,695 to Nelson et al., incorporated herein by reference, a one-way pager system is used to relay sports or financial information to a pager user who has contracted with the service provider for that service.

However, there are many potential, undiscovered applications of pager technology which may provide pager users with, as yet unheard of, abilities to communicate. This is particularly true of the developing two-way pager systems. Accordingly, there is a need for improved methods and applications of pager technology to meet the information, recreation and communication demands of pager users.

In particular, there are some types of information which are accurate and have value for relatively short periods of time. For example, information about the nightlife of an area must be current, in some cases up to the minute, in order for people to best find the activities and entertainment they prefer.

For a variety of reasons, the access to information about available activities and entertainment maybe difficult to obtain for a person looking for something to do. For example, a person seeking entertainment might not have immediate or ready access to a publication advertising possible activities. This is particularly true if the decision to find such an activity is made on the spur of the moment.

Moreover promoters of recreational events may not have or may not care to invest the funds necessary to widely advertise the event. This is particularly true of relatively small events or engagements at individual clubs. Alternatively, advertising that is purchased may not, for whatever reason, reach those who would be interested in the event. Finally, in the event of a spontaneous or unpublicized event, information regarding the event may only be available to people on the scene.

Accordingly, there is a need for a means to collect and disseminate such nightlife information. In particular, there is a need for a means to collect such information from the various and widespread points from which it is available and a means to quickly provided the information while it is still accurate and useful to those who are potentially interested.

SUMMARY OF THE INVENTION

It is an object of the present invention to meet the above identified needs and others. More particularly, it is an object of the present invention to provide a novel paging system and a method of using a the same to provide a means for collecting and disseminating current nightlife information so that the value of the information is of maximum value to those who are interested in receiving it.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may encompass a paging system including: a nightlife information database; a processor for accessing the nightlife information database; a transmitter for transmitting the information to a pager; and a profile database of subscriber profiles. Each of the profiles describe types of nightlife information a particular subscriber wishes to receive. The processor selects information to be transmitted to the particular subscriber in accordance with the particular subscriber's profile.

The system of the present invention may further encompass a pager having: a display; an antenna; and a controller. The nightlife information transmitted by the paging system is received by the antenna and displayed on the display.

The paging system of the present invention may further comprise a receiver for receiving transmissions from the pager. The pager may further comprise an input device for inputting data to the controller. The data may be transmitted with the antenna to the receiver of the paging system.

The input device may be a virtual keyboard, and may include a transmit icon and an inquiry displayed on the display such that data is transmitted by the pager to the receiver in response to the selection of the transmit icon and a request for nightlife information is transmitted by the pager to the receiver in response to the selection of the inquiry icon. According to the principles of the present invention, the processor of the paging system may add data transmitted from the pager to the nightlife information database.

Finally, the present invention may comprise means for detecting the location of a pager, and means for transmitting to the pager nightlife information which is relevant to that location.

The present invention may also encompass a method of using a paging system including the steps of: compiling a database of nightlife information; accessing the nightlife information database with a processor; transmitting the information to a pager with a transmitter; and compiling a profile database of subscriber profiles.

Each of the profiles may describe types of nightlife information a particular subscriber wishes to receive. The method of the present invention may also include the step of selecting information to be transmitted to the particular subscriber in accordance with the particular subscriber's interest profile.

The method of the present invention, may further include the steps of: providing a pager; displaying data on a display of the pager; and receiving transmitted information with an antenna of the pager. The step of receiving data may further comprise receiving nightlife information transmitted by the paging system. The step of displaying data may further comprise displaying the nightlife information.

The method of the present invention may further include the steps of: receiving transmissions from a pager with a receiver of the paging system; inputting data to a controller of the pager with an input device provided on the pager; and transmitting the data to the paging system. The step of inputting data may further comprise displaying a transmit icon. The step of transmitting data may further comprise selecting the transmit icon to transmit data entered with the input device.

The method of the present invention may further include the step of adding data transmitted from the pager to the nightlife information database. Finally, the method may include the steps of determining the location of a pager with the paging system; and screening the information for information relevant to that location.

Finally, the method of the present invention may include the steps of displaying an inquiry icon on the display of the pager; and selecting said inquiry icon to transmit a request for nightlife information. Accordingly, the steps of accessing the nightlife information database and transmitting nightlife information to a pager are performed in response to the transmitted request for information.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

Using the drawings, the preferred embodiment of the present invention will now be explained. Under the principles of the present invention, pager technology can be adapted to provide a means for collecting and disseminating nightlife information while it is accurate and valuable to those interested in receiving it.

Figure 3:
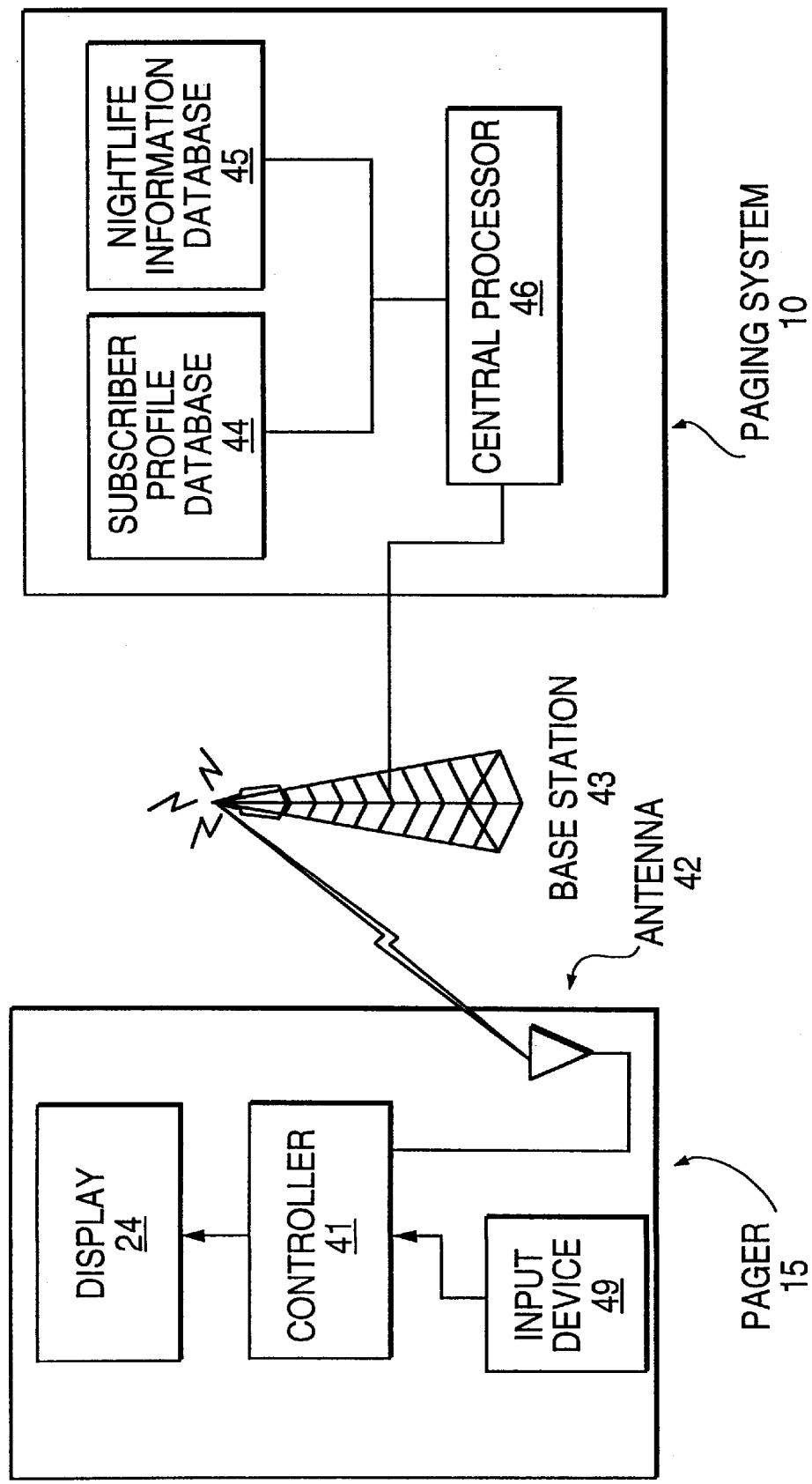
FIG. 3 is a diagram of the key components of the system of the present invention.

As illustrated in FIG. 3, under the principles of the present invention, a service provider maintains a paging system 10. When a subscriber contracts with the service provider for pager service, the subscriber may indicate a desire for the service provider's nightlife information service. Under the principles of the present invention, the subscriber may then provide the service provider with an interest profile.

A subscriber's profile lists a variety of information about the subscriber's interests. For example, a subscriber's profile will indicate what clubs, bands, types of music, events, foods etc. in which the subscriber has an interest. The service provider will store the subscriber's profile in a database 44 for use by the paging system 10. The subscriber may also contact the service provider to update the profile as necessary.

As described above, a pager and paging system may allow for one-way or two-way paging. The principles and features of the present invention may be practiced with either type of paging system. However, the preferred embodiment is practiced with a two-way paging system.

In a one-way paging system, the service provider must collect the nightlife information desired by subscribers. This information, when collected, is stored in a database 45. Because the nightlife information is typically only accurate and, therefore, valuable for a short period, a central processor 46 monitors the information in the database 45.

The processor 46 also accesses the database 44 of subscriber profiles. Using the profile information, the processor 46 will screen the information in database 45 to determine whether any of it is of interest to particular subscribers. When the processor 46 identifies information in database 45 in which a particular subscriber would be interested, the processor 46, using base station 43, transmits the information to that subscriber's pager 15.

The pager 15 is provided with an antenna 42 to receive transmissions from the base stations of the paging system 10. A controller 41 in pager 15 receives the information via antenna 42, displays the information on a display 24, and alerts the subscriber. The subscriber may then read the information on display 24 and decide whether to take advantage of the nightlife information.

As noted, the nightlife information with which the present invention is concerned is often difficult to obtain. In a one-way paging system, the service provider may collect information for database 45 by monitoring nightlife information in area publications, to the extent that such information is published. The service provider may also make its own efforts to collect the information.

The service provider may be assisted in this endeavor by the owners of night clubs and the promoters of events. Knowing that the service provider can quickly and cheaply target people who would likely be interested in a particular entertainment, club owners and event promoters may contact the service provider with nightlife information for the service provider to disseminate to subscribers.

Further, pursuant to an arrangement between the service provider and a club owner or event promoter, or at the instance of a club owner or event promoter, subscribers to the nightlife information service may be offered special promotions or accorded VIP treatment. The service provider could transmit notice of the special promotion to subscriber's who would then show the transmission on their pager displays to receive the terms of the promotion.

An even more effective means of gathering nightlife information involves those who subscribe to the nightlife information service. Subscribers may serve as an information gathering network. Because subscribers will have an interest in the service provider's ability to collect the type of information they wish to receive, they may telephone the service provider with nightlife information they become aware of. The information can then be disseminated to other subscribers who may be interested. Accordingly, the subscribers themselves become an information gathering network.

This method of accumulating nightlife information is facilitated in the preferred embodiment of the present invention which is practiced with a two-way paging system. As mentioned above, in a two-way paging system, the subscribers may use their pagers 15 to send messages to the paging system 10.

An input device 49 is provided on pager 15 with which the subscriber can enter a message regarding nightlife information of which the subscriber has become aware. Controller 41 then transmits the input, using antenna 42, to the paging system 10. The information is received by processor 46, through base station 43, and stored in database 45. The information can then be matched to subscriber profile parameters and transmitted to those subscribers who may be interested.

Figure 2:
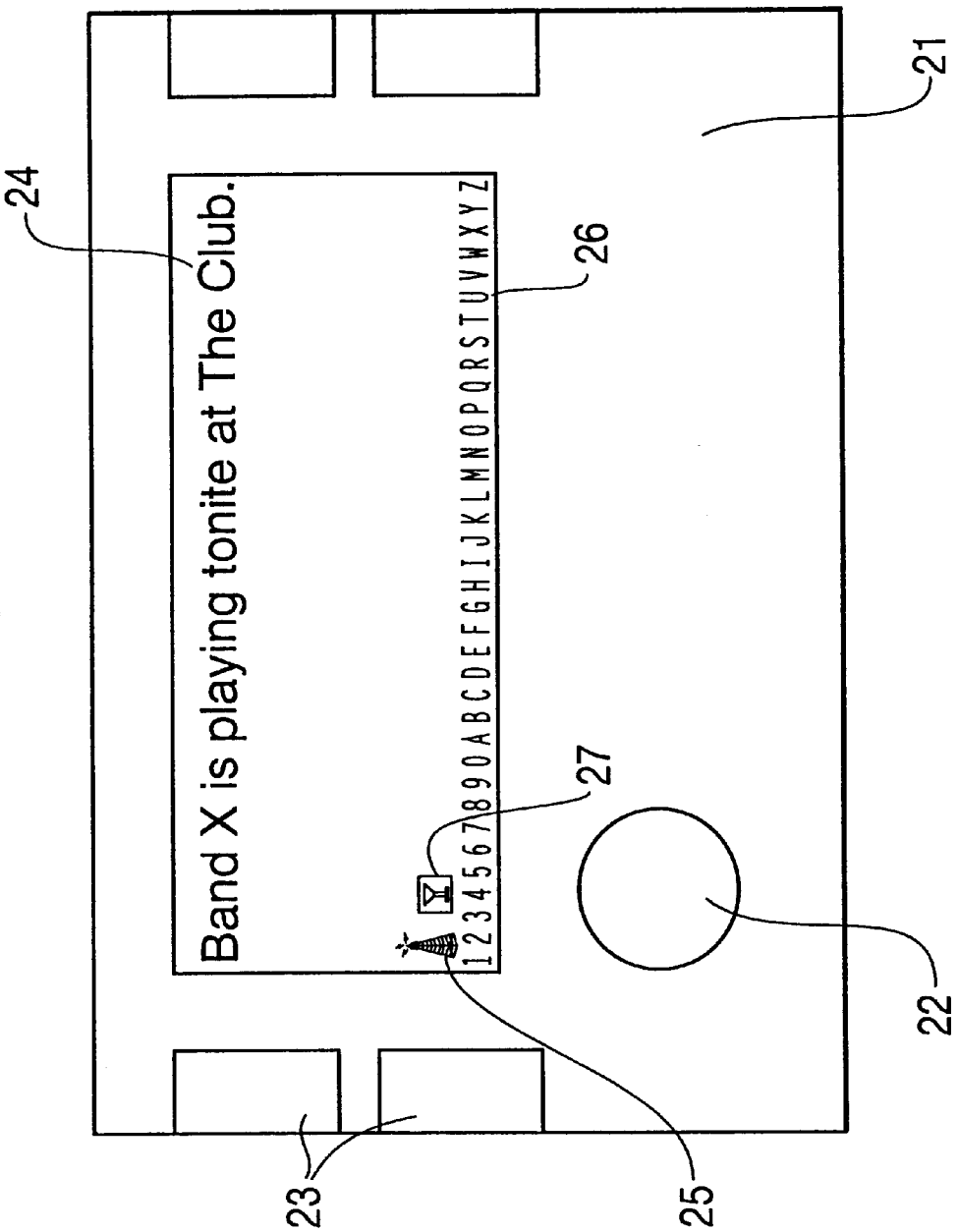
FIG. 2 is a diagram of a pager according to the principles of the present invention.

As shown in FIG. 2, under the principles of the present invention, the input device of pager 21 may be a virtual keyboard 26. The virtual keyboard 26 consists, in part, of the letters of the alphabet and digits 0 to 9 displayed on display 24 of pager 21. The pager 21 is also provided with buttons 23 for moving a cursor (not shown) on display 24.

When a particular letter or number of the virtual keyboard is highlighted by the cursor, the subscriber can press button 22 to select that letter or number. The selected letter or number is added to a message which is preferably displayed on display 24. By repeating this procedure a number of times, the subscriber can produce a message conveying nightlife information.

When the message is complete, the subscriber selects a transmit icon 25 using the cursor and buttons 23, 22 in the manner described above. The pager 21 then transmits the message to the paging system for dissemination to other subscribers. Those skilled in the art will recognize that other equivalent alphanumeric input devices could be used under the principles of the present invention in place of the virtual keyboard 26.

In a two-way paging system, the subscriber also has greater control over when nightlife information is received. For example, according to the principles of the present invention, the pager 21 may be provided with an information inquiry icon 27. When this icon is selected as described above using buttons 23, 22, a request for nightlife information is transmitted to the service provider.

Upon receipt of the request signal, the service provider will retrieve the interest profile of the subscriber who sent the inquiry and determine if any current nightlife information matches that profile. Any information that matches is then transmitted to the subscriber as before.

To further refine the usefulness of information sent to subscribers under the principles of the present invention, the nightlife information sent to the subscriber may be specific to particular areas designated by the subscriber in the subscriber's profile. Alternatively, because a two-way paging system can determine the rough location of a pager transmitting data to the system, the nightlife information transmitted to that pager may be specific to a general area where the pager is located at any given time.

Figure 1:
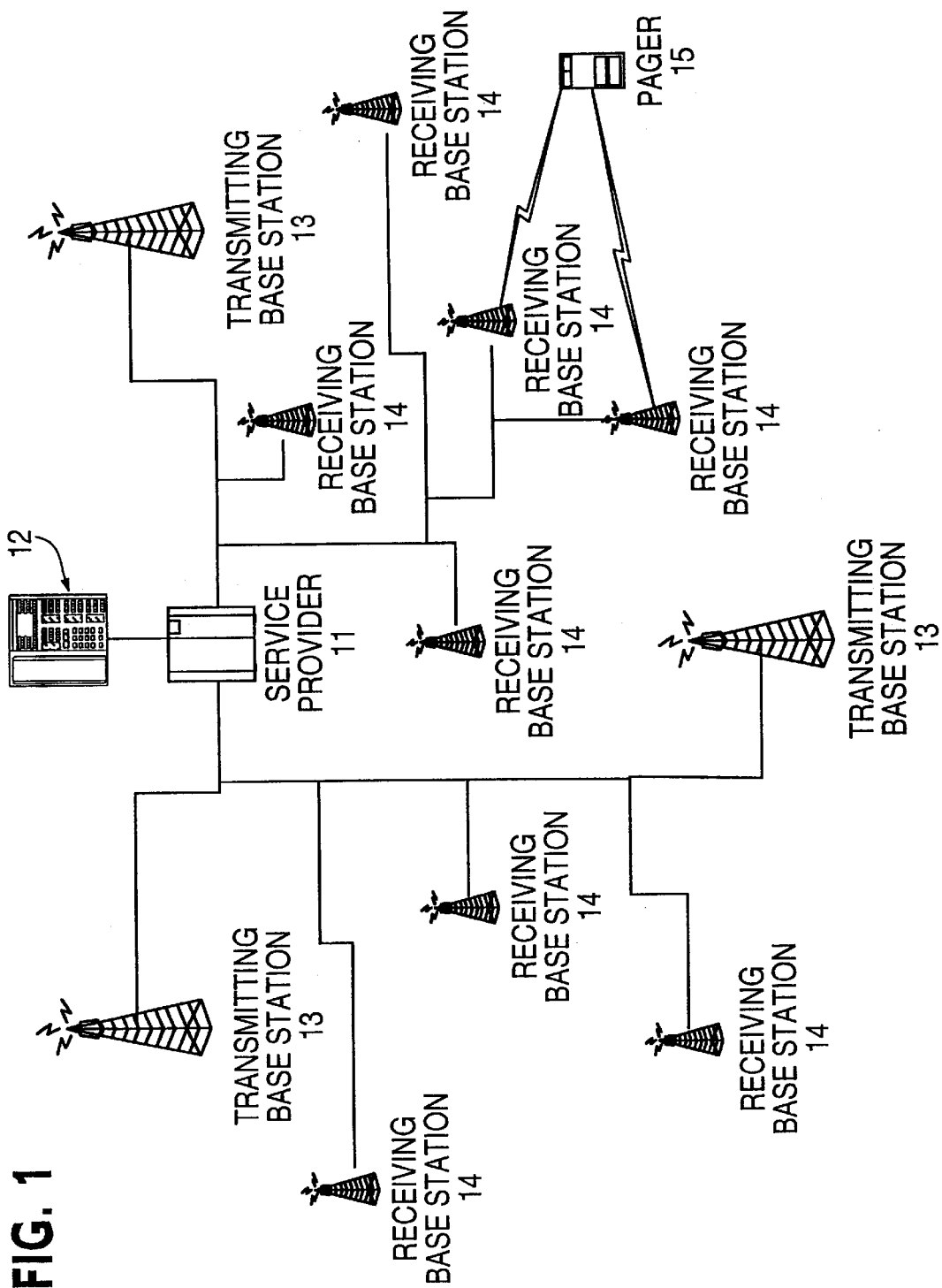
FIG. 1 is a schematic diagram of a conventional two-way paging network with which the present invention may be practiced.

With reference to FIG. 1, the method of determining the general location of a pager 15 using a two-way paging network will now be briefly described. Because the strength of a transmission from a pager 15 is tightly constrained by the battery power available to the pager, a two-way paging system must include a greater number of receiving base stations 14 than transmitting base stations 13.

The receiving base stations 14 are smaller and distributed more widely that transmitting base stations 13 in order to receive the relatively weak transmissions broadcast by individual pagers 15. The receiving base stations 14 must be sufficient in number and distribution to receive pager transmissions originating anywhere in the area served by the service provider.

In a two-way paging system, a transmission from a pager 15 may be received by one or more receiving base stations 14. By determining which base station 14 is receiving the pager signal or, if more than one base station is receiving the pager signal, which base station is receiving the stronger signal, the general location of the pager 15 and, thus, the pager user can be roughly determined. This is based on the generally true principle that the base station 14 receiving the strongest signal from the pager 15 is geographically closest to that pager.

Accordingly, the processor 46 of the paging system 10 can first screen the available nightlife information for that information in which a subscriber has expressed an interest in his or her subscriber profile. The system can then, or alternatively, determine the rough location of the subscriber's pager and send only that nightlife information which is specific to that area.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A paging system comprising:

an information database from which subscribers have subscribed to receive information;

a processor for accessing said information database to provide said information to subscribers;

a transmitter for transmitting information from said database to said subscribers;

a pager of a subscriber for receiving and displaying said transmitted information; and a user input device for inputting data to said pager, said pager further comprising a transmitter for transmitting said input data to said processor;

wherein said processor adds data transmitted from said pager to said information database so that said information transmitted by said pager is accessed from said database and transmitted to other subscribers.

2. The paging system of claim 1, wherein said user input device is a virtual keyboard.

3. The paging system of claim 1, wherein said user input device includes a transmit icon displayed on said pager such that said input data is transmitted by said pager to said processor in response to selection of said transmit icon.

4. The paging system of claim 1, wherein said information transmitted to a pager comprises nightlife information.

5. The paging system of claim 1, wherein said user input device includes an inquiry icon displayed on said display such that a request for information is transmitted by said pager to said processor in response to selection of said inquiry icon.

6. The paging system of claim 1, wherein said paging system further comprises means to determine a location of said pager, and said information transmitted to said pager is specific to said determined location.

* * * * *